United States Patent [19]

Borer et al.

[11] Patent Number: 4,983,204
[45] Date of Patent: Jan. 8, 1991

[54] APPARATUS FOR BENDING GLASS SHEETS

[75] Inventors: John W. Borer, Toledo, Ohio; Lowell J. Conner, Lathrop, Calif.

[73] Assignee: Libbey-Owens-Ford Co., Toledo, Ohio

[21] Appl. No.: 453,678

[22] Filed: Dec. 20, 1989

[51] Int. Cl.$^5$ .............................................. C03B 23/02
[52] U.S. Cl. ........................................ 65/273; 65/287; 65/348
[58] Field of Search ................. 65/104, 106, 107, 273, 65/348, 351, 287

[56] References Cited

U.S. PATENT DOCUMENTS

4,357,156 11/1982 Seymour ............................... 65/104
4,522,641 6/1985 Hagedorn et al. ................. 65/273 X
4,897,102 1/1990 Modesitt et al. ................... 65/287 X Primary Examiner—Robert L. Lindsay
Attorney, Agent, or Firm—Marshall and Melhorn

[57] ABSTRACT

A press bending mold having an improved shaping element comprising a flexible, continuous shaping surface that is readily adjustable and easy to fabricate. The shaping element is mounted on a support plate by a plurality of adjustable connectors, and includes a resilient body having an expanded metal grid encapsulated therein. The resilient body may be covered by one or a plurality of sheets of a fibrous, heat-resistant material which, in turn, is covered by a layer of fiberglass cloth, or the such. One or more of the fibrous sheets may be treated with a rigidizer.

17 Claims, 3 Drawing Sheets

APPARATUS FOR BENDING GLASS SHEETS

BACKGROUND OF THE INVENTION

1. Field of the Invention

The present invention relates generally to the production of bent sheets of glass, and more particularly to a novel adjustable mold for bending such sheets.

2. Description of the Prior Art

Curved or bent sheets of glass are commonly used as glazing closures in automotive vehicles and the like. It is imperative that the glass sheets be bent to precisely defined curvatures determined by the configuration and size of the vehicle openings as well as the overall styling of the vehicle. At the same time, the bent sheets must meet stringent optical requirements. i.e., the viewing area of the closure or window must be free from optical defects that would tend to interfere with clear viewing therethrough Thus, it is necessary that the bending apparatus not only shape the glass sheets to precise curvatures, but also that it do so without adversely affecting their optical quality.

Over the years as automotive styling has evolved, the shapes to which the sheets must be bent have become increasingly complex and difficult to efficiently produce on a mass-production basis. Such curved or bent sheets are now generally produced by a so-called "press bending" technique wherein flat glass sheets are heated to a temperature corresponding substantially to the softening point of the glass. The heated sheets are then pressed or shaped to the desired curvature between male and female mold members having complementary shaping surfaces. The bent sheets are cooled in a controlled manner to either anneal or temper the glass as dictated by their intended end use. Such press bending may suitably be carried out with the sheets oriented vertically, horizontally or obliquely. To achieve a high degree of accuracy in the configuration of the curved sheet while minimizing the application of pressure to the glass surfaces in their viewing area by the press members, the male or convex mold member is generally constructed with a solid or continuous shaping surface which contacts the entire surface of the sheet. Conversely, the cooperating female or concave mold member is constructed with an outline or ring-type shaping surface which engages only the peripheral edge portions of the sheet.

Various materials including wood, metal and refractories have been employed in fabricating the solid or continuous shaping surface of such mold members. Due to a number of factors including deterioration of the material and distortion of the bending surface caused by the repeated heating and cooling of the mold over extended periods of use, none has proven entirely satisfactory. Metal molds are frequently employed and although quite durable, they tend to become distorted in the fluctuating temperature environment and as warping or distortion occurs, it is necessary to frequently rework the mold to restore its surface to the prescribed configuration.

Adjustable surface metal molds were developed in response to the distortion problem. Typically, the shaping surface comprises a continuous, relatively flexible metal plate affixed to a rigid backing plate or structure by a plurality of strategically located adjustable posts or screws. The degree of adjustment tolerable is dependent primarily on the thickness and flexibility of the metal employed. Many of the present day automobile windows are formed to compound curvatures, i.e., sheets bent about mutually perpendicular axes of bending. In order to produce these curvatures it is necessary that the metal sheet be preshaped to the approximate desired curvature since the metal is relatively inelastic and not adapted to being formed to compound curvatures by pure bending. Once the curvature is set, slight modifications can be made to the surface configuration by manipulation of the adjusting screws. However, excessive manipulation will cause creases or ripples to form in the surface of the metal sheet, resulting in an unsuitable shaping surface.

More recently, molds having so-called flexible continuous shaping surfaces have been proposed. As disclosed in U.S. Pat. No. 4,522,641, issued June 11, 1985, one such mold utilizes a shaping element comprising a resilient body having a latticework of flexible metal bands encapsulated therein. The shaping element, in turn, is affixed to a base member by a plurality of adjusting devices located at spaced intervals along the flexible bends. The encapsulating material comprising the resilient body and providing the design surface for the shaping element may be a material such as silicone rubber or other resilient material which is flexible and able to withstand the high temperatures to which it is subjected. The glass-facing surface of the shaping element is covered by a layer of material such as fiberglass cloth to present a smooth resilient surface to the heat-softened sheet. It is disclosed that one or more layers of untreated Fiberfrax ® paper may be disposed between the shaping element and fiberglass cloth to insulate the silicone rubber from the heat and smooth out any irregularities which may appear on the surface of the shaping element.

While such molds represent a distinct improvement over earlier solid male molds, considerable time and labor is associated with the assembly of the individual metal bands to form their latticework. Furthermore, certain limitations exist which may restrict their use under some circumstances. The construction is best suited for molds having a generally rectangular configuration, and it is not readily adaptable to more complex configurations, especially those that are relatively narrow or have adjacent sides that form a rather sharp included angle. Such configurations create regions with very limited adjustability and therefore are not well suited for this construction.

SUMMARY OF THE INVENTION

The present invention overcomes the above noted shortcomings of the prior art by providing an improved bending mold having a continuous shaping surface that is readily adjustable and relatively easy to fabricate. The novel mold comprises a continuous shaping element including a resilient body having a sheet of expanded metal encapsulated therein. The expanded metal is attached at spaced intervals to a rigid support plate by a plurality of adjustment devices that generally determine the contour of the shaping element. The adjustment devices provide a means for altering the contour, and include remote controls that are readily accessible to an operator. The resilient body may be covered by one or more sheets of a ceramic fiber product, for example, the alumino-silicate fiber material commercially available under the name "Fiberfrax". The shaping surface is covered by a layer of fiberglass cloth or the such to provide a smooth resilient surface for the glass sheet.

It is therefore a primary object of the present invention to provide an improved adjustable bending mold for bending glass sheets.

Another object of the invention is to provide such a mold including a flexible continuous shaping element having adjusting means for altering the contour thereof.

Still another obJect of the invention is to provide such a mold wherein the continuous shaping element is comprised of a minimum of parts so as to simplify fabrication.

Other objects and advantages of the invention will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENT

Figure 1:
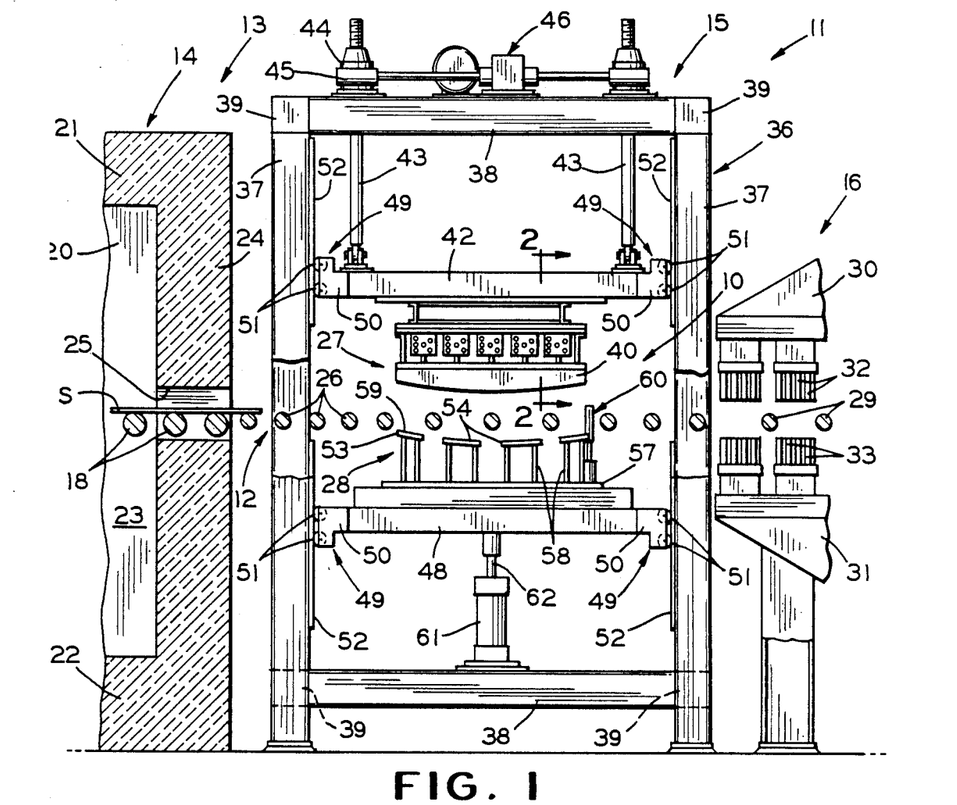
FIG. 1 is a side elevational view of a press bending apparatus embodying the novel bending mold of the invention.

Referring now to the drawings, there is illustrated in FIG. 1 the improved bending member of the invention, generally designated 10, embodied in a horizontal press bending and tempering facility comprehensively designated 11 It should be understood that while the invention will be described in connection with a horizontal bending apparatus as illustrated in the drawings, it is not restricted to such an apparatus but also has utility in a vertical press bending apparatus or any other apparatus utilizing either a single mold or opposed press members for shaping sheets of glass or the like.

The facility 11 more particularly includes a continuous conveyor system 12 adapted to support a plurality of sheets S for movement in a generally horizontal path through a heating station 13 having a furnace 14 for heating the sheets to their softening point or bending temperatures, a bending station 15 embodying the bending member 10 whereat the sheets S are bent to the desired shape, and a tempering station 16 for rapidly reducing the temperature of the bent sheets to produce the desired temper therein. While a tempering station is described as part of the facility, the invention is not restricted thereto but may as well be utilized in a facility wherein means are provided to appropriately cool the sheets of glass to annealing temperatures subsequent the bending operation.

Typically, the glass sheets S are heated in a controlled manner while being conveyed through the furnace 14 on aligned conveyor rolls 18 forming part of the conveyor system 12. The furnace 14 may be of any conventional construction and is illustrated in FIG. 1 as a tunnel type furnace having a heating chamber 20 defined by a roof 21, a bottom wall 22, opposite side walls 23 and an end wall 24. The heating chamber 20 is heated by suitable heating means such as gas burners or electrical resistance heaters (not shown) disposed in the top and side walls and suitably regulated to provide a desired heating pattern for the glass sheets moving therethrough.

The sheets S are carried through the heating chamber 20 on the conveyor rolls 18 of the conveyor system 12 which extends from the entrance end (not shown) of the furnace 14 through an opening 25 in the end wall 24. The glass sheets S are heated to substantially the softening point of the glass as they are conveyed through the controlled temperature environment of the furnace 14. Upon exiting the furnace through opening 25, the sheets S are received on a second series of conveyor rolls 26 for movement into and within the bending station 15 between opposed upper and lower press members 27 and 28, respectively, which impart the desired curvature thereto.

After the sheets are bent, they are advanced along the conveyor 12 on a third series of rolls which convey the glass sheets S through the tempering station 16. The bent glass sheets pass between upper and lower blastheads 30 and 31, respectively, having a plurality of tubes 32 and 33 operably disposed to direct opposed streams of cooling fluid, such as air or the like, towards and against the opposite surfaces of the sheets moving along the conveyor. Of course, if the sheets are to be annealed as for use in laminated windshields, the blastheads are not used and the sheets are instead allowed to cool slowly in a suitably controlled environment.

The press bending station 15, with reference to FIG. 1, comprises a skeletal framework 36, generally in rectangular parallelpiped form, including upstanding corner posts 37 interconnected at their top and bottom by longitudinal beams 38 and transverse beams 39 to form a rigid box-like structure. The rolls 26 of the bending station are drivingly mounted upon the framework in a conventional manner (not shown). Mounted within the framework 36 for reciprocating relative movement toward and away from each other are the upper and lower press members 27 and 28 which are provided with opposed complemental shaping surfaces conforming to the curvature to which the sheets are to be bent.

The upper or male press member 27, as will be hereinafter more fully described, comprises a shaping element 40 carried upon a platen frame 42. The platen frame is preferably constructed to be vertically adjustable in order to accommodate glass parts bent to varying degrees of curvature between the opposed press members. Accordingly, the platen frame 42 is operatively attached at each of its corners within the framework 36 to the lower ends of screw jack rods 43. The rods 43 are threadably received at their uppermost ends within rotatable collars 44 of screw jack bases 45 carried on a framework comprised by the beams 38 and 39 atop the framework 36. Also carried atop the framework is a motorized drive unit 46 adapted to rotatably drive the collars 44 in unison for retracting or extending the rods 43 to correspondingly raise or lower the platen frame 42 and the shaping element 40 carried thereby.

The lower or female press member 28, as will be hereinafter described, is also mounted for vertical reciprocal movement and is carried upon a platen frame 48 similar in construction to the platen frame 42. In order to insure that the frames move freely up and down along a precise vertical path within the framework 36, they are provided at each of their corners with stabilizing roller guide means 49. The guide means 49 include brackets 50 affixed to the corners of the platen frames 42 and 48. Each bracket carries a spaced pair of rollers 51 mounted perpendicularly to one another and adapted to rollingly engage track plates 52 affixed to adjacent angularly disposed faces of the associated corner posts 37. The platen frames are thus held firmly against lateral movement while being able to move freely up and down along a vertical path.

The lower press member 28 is of conventional outline or ring-type construction, and normally resides in a rest position below the rolls 26 of the bending station 15. The press member 28 is mounted for vertical reciprocal movement to lift a sheet S from the rolls 26 and press it against the upper press member 27, and then return the bent sheet to the rolls 26 for advancement out of the bending station 15 and onto the rolls 29 of tempering station 16.

In order to permit the lower or female press member 28 to pass upwardly between the rolls 26 for lifting the sheets therefrom, the press member 28 comprises a ring-type shaping rail 53 formed of a plurality of segments 54 spaced apart sufficiently to pass between adjacent ones of the rolls The individual segments 54 are affixed in spaced relation to a base member 57 by connecting rods 58 and conform in outline to the glass sheet to be bent and include an upwardly directed shaping surface 59 to impart the desired curvature to the sheet. The particular outline of the shaping rail 53, as well as the specific curvature of the shaping surface 59, of course, are dictated by the predetermined finished shape of the glass sheet being bent and can vary as desired. A spaced pair of vertically reciprocal stop means 60 (only one shown) is conventionally provided on the base member 57 between adjacent ones of the rolls 26 for precisely positioning incoming glass sheets S relative to the upper and lower press members 27 and 28, respectively.

The base member 57 is carried by the lower platen frame 48 and is movable therewith. A fluid actuated cylinder 61 is mounted beneath the platen frame 48 and carried by the beams 38. The cylinder includes a piston rod 62 affixed at its distal end to the platen frame 48 for reciprocally moving the lower or female press member 28 between its retracted position, whereat the shaping rail 53 is below the conveyor rolls 26, and its raised position whereat the ring segments are adapted to lift a heated sheet S from the conveyor rolls and press it against the male press member 27 between the complementary shaping surfaces of the male element 40 and the shaping rail 53, to bend it to a predetermined curvature. Upon completion of bending, the piston rod 62 is retracted to lower the platen frame 48, thereby retracting the shaping rail 53 beneath the conveyor rolls 26 and depositing the bent sheet thereon. The stop means 60 are, in the meantime, retracted so that the bent sheet is advanced out of the bending section by the rolls 26.

Figure 2:
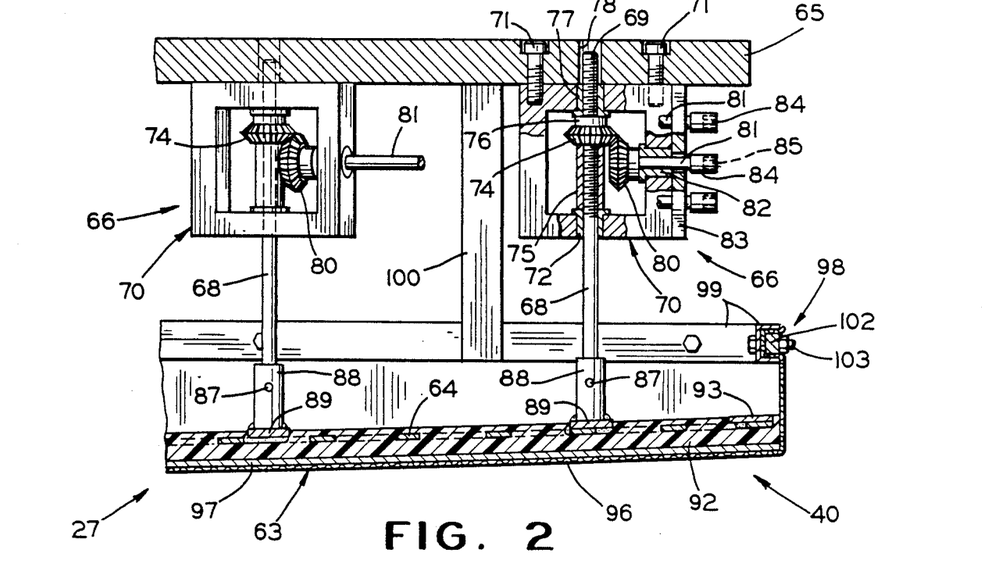
FIG. 2 is an enlarged, fragmentary, vertical sectional view taken substantially along 2—2 of FIG. 1, illustrating the adjusting means and shaping element in greater detail.
Figures 3, 4:
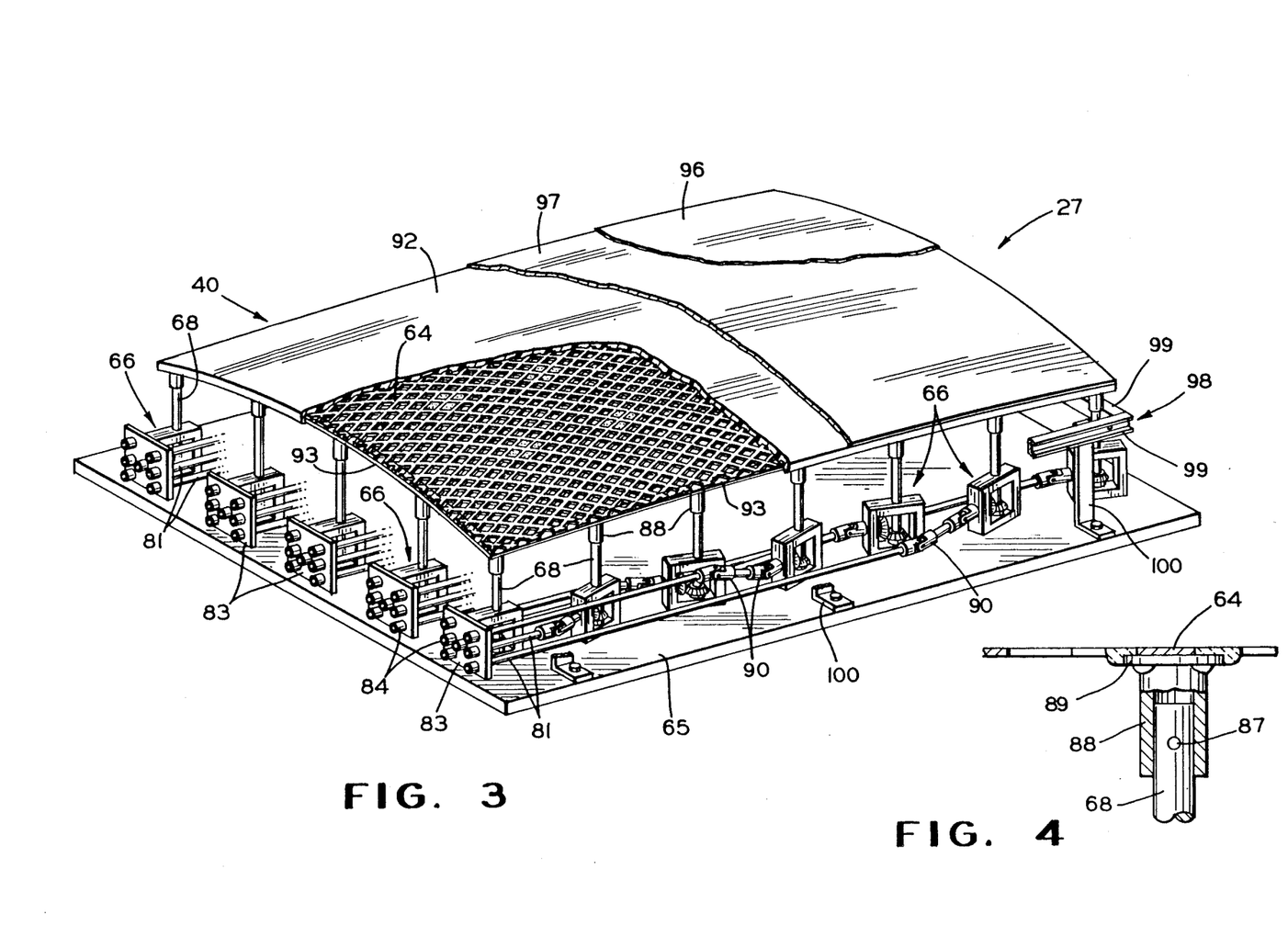
FIG. 3 is an inverted, enlarged perspective view of the novel bending mold, with portions broken away for purposes of clarity.
FIG. 4 is an enlarged, fragmentary sectional view of the distal end of one of the vertical posts of the adjustment device attached to the expanded metal sheet.

As best illustrated in FIGS. 2 and 3, the novel upper male press member 27 of the invention is of the so-called solid or continuous type. To that end, the male shaping element 40 includes a continuous glass contacting surface, identified generally at 63, having a configuration complementary to that of the lower female press member 28. The shaping element 40 comprises a commercially available resilient expanded metal grid 64 attached to a support plate 65 in spaced relation thereto by a plurality of adjustable connectors 66. The support plate 65, in turn, is affixed to the upper platen frame 42 by suitable means and moveable therewith.

The adjustable connectors 66, as will be hereinafter described, are adapted to provide the flexible expanded metal grid 64 with an adjustable surface contour corresponding to the curvature to be imparted to a sheet bent thereon. The connectors are strategically positioned to provide sufficient support to the flexible grid to resist deformation during the bending process and to permit adjustments to be made to the contour when necessary. The number of connectors 66 required and the particular arrangement varies and is determined by the part being produced.

Referring now to FIG. 2, the adjustable connector 66 includes an actuating rod 68 having one end thereof provided with external threads 69 that extends through a gear housing 70 attached to the support plate 65, as by screws 71. The rod 68 extends through a bushing 72 affixed to one wall of the housing 70 and through a bevelled gear 74 mounted within the housing 70 for rotary movement, but fixed against axial movement, by means of a spacer 75. The gear 74 includes a shank 76 having an internal thread for threaded engagement with the external threads 69 of rod 68. The rod 68 projects outwardly through a bushing 77 affixed to the opposite wall of the housing 70. The base member 65 is provided with an opening 78 in axial alignment with the rod 68 to allow unhindered reciprocation thereof. Meshing with the beveled gear 74 is a related bevel gear 80 secured to one end of a control shaft 81 extending through a bushing 82 affixed to a side wall of the gear housing 70. The control shaft 81 is of a suitable length to extend through an appropriate opening in a mounting plate 83 conveniently located to one side of the support plate 65. The free end of the shaft 81, i.e., the end of the shaft extending outwardly through the plate 83, is fitted with a socket 84 having a flat-sided opening 85 therein for receiving a tool (not shown) having a complementary shaped working end for rotating the shaft 81 Rotation of the shaft 81, as can be readily appreciated, will effect the axial displacement of rod 68 through the arrangement of the bevelled gears 74 and 80 in the housing 70. Indicia indicating the relative position of the respective adjustable connector it controls and the direction of displacement of the rod 68 may conveniently be placed on the individual sockets 84 or on the plate 83 adjacent each socket.

The distal end of the actuating rod 68, as best shown in FIG. 4, is secured by a suitable means such as a conventional roll pin 87, to a cylindrical collar 88 affixed to the expanded metal grid 64 as by welding. The collar can be welded directly to the metal grid, however, it is preferred to affix a flat metallic plug 89 to the collar 88, also as by welding, prior to its welding to the metal rid 64. In so doing, an increased control surface is provided thereby increasing the surface area for welding and reducing the tendency of the expanded metal to kink or buckle adjacent the collar 88 as the actuating rod 68 is extended and retracted. Instead of the plug 89, the collar may be formed with an enlarged integral flange portion (not shown) that is welded to the metal grid.

Referring now to FIG. 3, a plurality of the adjustable connectors 66 are conveniently aligned in columns with the respective sockets 84 located to one side of the support plate 65. The sockets of each column are disposed in a cluster on one of the mounting plates 83. To that end, all but the centermost control shaft of each cluster are articulated and provided with at least one flexible coupling or torque transmitting universal joint 90 interposed between the gear 80 and the socket 84 of each respective combination. The centermost control shaft 81 leads directly to the gear 80 of the first adjustable connector 66, as shown in FIG. 2, and therefore does not require a universal joint 90.

The novel press member 27 is shown in inverted position in FIG. 3 with parts broken away to more clearly illustrate the construction of the shaping element 40. More particularly, the shaping element 40 comprises the flexible expanded metal grid 64 encapsulated in a body 92 of silicone rubber, such as that sold under the trade name RTV, or other resilient material that remains flexible and is capable of withstanding repeated exposure to a high temperature environment. The metal grid 64, as above described, is supported in a spaced relation to the support plate 65 by a plurality of adjustable connectors 66. The actuating rods 68 of the adjustable connectors are set, as hereinafter described, to provide the metal grid 64 with a surface contour generally corresponding to the curvature to be imparted to a sheet bent thereon.

The flexible expanded metal grid 64 is commercially available in sheet form and is provided in a variety of thicknesses. The grid 64 need be of a thickness that will resist deformation during the bending process and yet permit adjustments to be made to the contour by means of the adjustable connectors 66. Such a grid may, although not limited thereto, be on the order of 0.125 - 0.1875 inch (3.18 - 4.76mm) thick, for example.

The shape or outline of the metal grid 64 is determined by the outline of the sheet to be bent thereby, and is cut to the desired shape from a larger sheet of expanded metal. The shaping element 40, and therefore the grid 64, are illustrated for convenience sake, as being generally rectangular in shape. However, it is contemplated that nearly any shape can be utilized without departing from the scope of the invention. Relatively thin metal bands 93 are affixed, as by welding, to the peripheral margin of the metal grid 64 to define the perimeter of the shaping surface as well as to insure continuity and a smooth transition area between adjacent adjustable connectors 66 subsequently attached thereto. Steel bands approximately 1.0 inches (25.40 mm) wide by 0.125 inch (3.18 mm) thick, although not restricted to such dimensions, have proven satisfactory for such use.

The shaping surface of the encapsulated grid 64 is typically covered with a suitable non-abrasive heat-resistant material, such as fiberglass cloth 96, to present a smooth and somewhat resilient surface to the heat-softened glass. However, it has been found desirable to interpose one or more layers of an insulating cover 97 between the fiberglass cloth and the encapsulated grid to insulate the silicone from the hot glass and assist in smoothing out any irregularities in the shaping surface. The insulating cover 97 comprises a mat of silica, alumina or alumino silicate fibers bonded together with 1 to 25 percent by weight of an inorganic binder such as colloidal alumina, colloidal silica or a mixture thereof. A particularly suitable material is available commercially under the product designation Fiberfrax ® Duraboard 1200. The cover can be left untreated or, preferably, may be treated with a suitable rigidizer such as that available from the Carborundum Company under the name Rigidizer W. The material is an inorganic liquid binder compound comprising an aqueous suspension of about 40% colloidal silica and a wetting agent which, when applied to the fibrous material, causes a significant increase in the rigidity and surface hardness of the layer. The mold shaping surface can be adapted as determined appropriate for bending a particular part, by providing more than one insulating layer as previously mentioned, and using the layers in the untreated state or treating any combination with the rigidizer to provide the degree of rigidity or hardness desired.

The fiberglass cloth 96, as best shown in FIGS. 2 and 3, covers the layer or layers of the insulating cover 97. The cloth 96 extends over the sides and ends of the shaping element 40 and is secured within a peripheral clamping device 98 so as to be maintained in a taut, wrinkle-free condition over the insulating cover 97. The clamping device comprises a series of outwardly facing channel members 99 mounted upon the support plate 65 by means of angle brackets 100. The peripheral margins of the cloth 96 are engaged within the channel members by clamping bars 102 secured to the channel members as by threaded fasteners 103.

Figure 5:
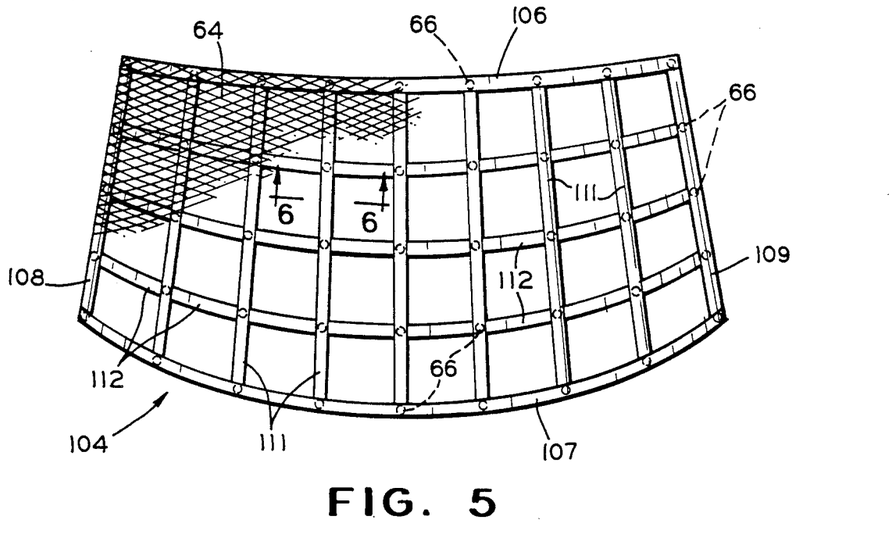
FIG. 5 is an inverted, diagrammatic plan view illustrating an alternate embodiment of the bending mold of the invention.
Figure 6:
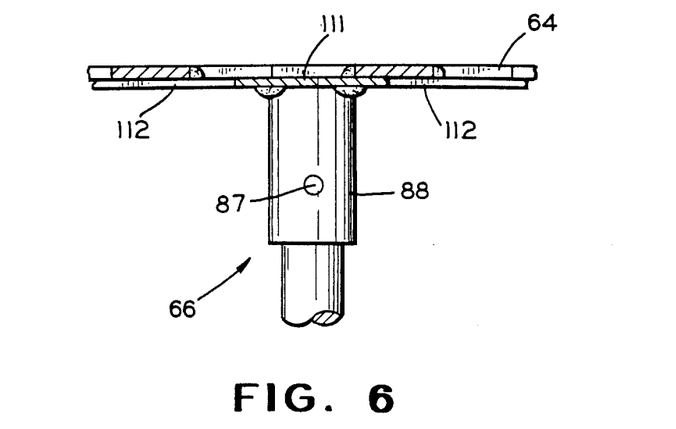
FIG. 6 is an enlarged, vertical sectional view taken substantially along line 6—6 of FIG. 5.

Referring now to FIGS. 5 and 6, there is shown an alternate embodiment of the invention illustrating a somewhat different method for affixing the collars 88 to the expanded metal grid 64. When constructing relatively large press members such as for backlights and windshields and those having rather simple or gentle contours, it is sometimes more practical and economically feasible to space the adjustable connectors 66 farther apart than the distance required by the smaller and more complex parts. When the connectors are spaced apart a distance greater than approximately 4 inches (101.6 mm) it may be difficult to impart a smooth transitional curve between adjacent connectors due to the flexibility of the metal grid and the lack of support. Of course, this has an adverse effect on the shape of the glass product being formed.

To prevent this, in accordance with the alternate embodiment, a skeletal grid assembly, designated 104, is fabricated for affixing to the prearranged adjustable connectors 66 prior to spot welding the expanded metal grid 64 thereto. The skeletal grid 104 comprises opposed longitudinal bands 106 and 107 joined at their free ends by lateral bands 108 and 109. The length, shape and arrangement of the individual bands is determined by the part to be produced, and form the peripheral outline thereof. A plurality of spaced bands 111 extending transversly with respect to longitudinal bands 106 and 107, is disposed intermediate the lateral bands 108 and 109. The position of the bands is determined by the preferred location of the adjustable connectors 66, as will hereinafter be explained. The bands 111 are shown substantially equally spaced and parallel to bands 108 and 109. However, this is not to be construed as a limitation as the arrangement of the bands can vary considerably without departing from the spirit of the present invention. As shown in FIG. 5, the adjustable connectors 66 are located in space relation along the perimeter of the skeletal grid 104 on bands 106, 107, 108 and 109, as well as along the transverse bands 111. The location of the connectors is determined to provide sufficient support and adjustability to the shaping surface. A plurality of band segments 112 is interposed between the pairs of adjacent bands 108, 109 and 111 at the location of each connector 66.

The bands comprising the skeletal grid 104, although not limited thereto, can be steel and 0.75 inches (19.05 mm) wide by 0.125 inch (3.18 mm) thick. All the bands are disposed and welded in an abutting relationship, as shown in FIG. 6, to provide a smooth, uninterrupted support surface for the expanded metal grid 64 at each of the joints as well as the area therebetween.

Thus, with the arrangement of bands in the skeletal grid assembly 104, it is readily understood that the axial force exerted by each connector 66 located within the perimeter of grid 104 is distributed radially outwardly along bands 111 and 112. The distribution of force alleviates the stresses immediately adjacent the actuating rod, reducing the tendency for the expanded metal to bend sharply, or kink, thereabout and resulting in a smooth shaping surface with a minimum of irregularities.

In fabricating a male press member incorporating the novel shaping element 40 according to the invention, a predetermined number of the adjustable connectors 66 are mounted on the support plate 65 in a pattern dictated by the sheet to be bent. The metallic plugs 89, if utilized, are welded to collars 88 and the connectors are adjusted to the approximate contour of the sheet to be bent through the use of a female master form (not shown). The expanded metal grid 64 is cut to the desired shape and metallic bands 93 are welded around the periphery. The grid is formed over the arrangement of connectors and spot-welded thereto providing it with the desired contour. The entire assembly is then inverted and the expanded metal grid is submerged in a solution of RTV silicone contained in a mold (not shown) representing the approximate contour of the sheet to be bent. The grid is submerged to a depth to produce an outer silicone layer of approximately 1⅛ inch (3.175 mm) after curing. If desired, a Fiberfrax ® or similar insulating layer can be placed in the mold prior to adding the silicone solution, providing the silicone shaping surface with an exposed, integral insulating layer after curing. If desired, the insulating layer may be rigidized, as previously described, before the molding step. After the silicone is completely cured, the assembly is removed and the shaping surface is covered with a fiberglass cloth. Alternately, in place of or in addition to the integrally formed insulating layer, one or more insulating layers may be placed on the integral layer or the cured silicone surface prior to covering with the fiberglass cloth.

When fabricating a press member employing the skeletal grid assembly 104 of the invention, the precut and preformed metal bands are assembled in a predetermined pattern on a female master and welded to form the grid assembly. The adjustable connectors 66 are attached to the support plate 65 and spot welded to the grid assembly after they are properly adjusted. Formation of the silicone layer, as well as the insulating layers, is performed substantially as described above.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. An adjustable mold for use in bending a heat-softened glass sheet, comprising a rigid base plate, a continuous shaping element having a surface configuration corresponding generally to the curvature to which the glass sheet is to be bent, said shaping element including a sheet of flexible expanded metal, a resilient body portion covering said expanded metal, and a plurality of spaced, adjustable support means affixed to said rigid base plate for adjustably supporting said sheet of expanded metal in spaced relation to said rigid base plate, each said adjustable support means being adapted for selectively varying the distance between an associated area of said sheet of expanded metal and said rigid base plate to maintain said surface configuration in conformity with said curvature to which said glass sheet is to be bent.

2. An adjustable mold for use in bending a heat softened glass sheet, comprising a rigid base plate, a continuous shaping element having a surface configuration corresponding generally to the curvature to which the sheet is to be bent, said shaping element including a sheet of flexible expanded metal having a peripheral margin corresponding generally to the outline of said shaping element, a flexible band affixed to and extending around said peripheral margin, a resilient body encapsulating at least a portion of said sheet of expanded metal, a plurality of adjustable support means affixed to said rigid base plate adjustably supporting said sheet of expanded metal in spaced relation to said rigid base plate, each said adjustable support means including an actuating rod affixed at one end to said sheet of expanded metal, and a fibrous, heat resistant material disposed on said resilient body portion and defining said surface configuration.

3. An adjustable shaping mold as claimed in claim 1, wherein each said adjustable support means comprises an actuating rod affixed at one end to said sheet of expanded metal and means for extending and retracting said actuating rod.

4. An adjustable mold as claimed in claim 1, wherein said sheet of flexible expanded metal is encapsulated in said resilient body portion.

5. An adjustable mold as claimed in claim 1, including an insulating layer disposed on said resilient body portion and defining said surface configuration.

6. An adjustable mold as defined in claim 5, wherein said insulating layer comprises a fibrous, heat resistant, normally pliable material that is treated with a rigidizer material for increasing the stiffness thereof.

7. An adjustable shaping mold as claimed in claim 1, wherein said sheet of flexible expanded metal comprises a peripheral margin corresponding generally to the outline of said shaping element, and a plurality of flexible bands affixed to at least a portion of said peripheral margin, whereby said flexible bands maintain said peripheral margin of said sheet of expanded metal at a generally smooth, continuous contour corresponding to the desired contour for said glass sheet.

8. An adjustable shaping mold as claimed in claim 7, wherein a plurality of said adjustable support means is affixed at spaced intervals to said plurality of flexible bands.

9. An adjustable shaping mold as claimed in claim 1, wherein each said adjustable support means comprises an actuating rod, said actuating rods affixed at one of their ends to said sheet of expanded metal at spaced intervals thereover, at least one of said actuating rods including an enlarged generally planar member attached to said one end, and means for extending and retracting said actuating rods.

10. An adjustable shaping mold as claimed in claim 9, wherein said enlarged, generally planar member includes means adapted for attachment to said one end of said actuating rod.

11. An adjustable shaping mold as claimed in claim 3, wherein each said extending and retracting means includes a gear assembly operatively connected to said actuating rod at the end opposite said one end, and a control shaft connected at a first end thereof to said gear assemblies whereby rotation of said control shaft will effect axial displacement of said actuating rod.

12. An adjustable shaping mold as claimed in claim 11, wherein at least one of said control shafts includes a second end and a torque transmitting universal joint disposed intermediate said first and said second ends.

13. An adjustable shaping mold as claimed in claim 1, wherein said shaping element comprises a sheet of flexible expanded metal having a peripheral margin corresponding generally in outline to said shaping element, a skeletal framework affixed to said sheet of flexible expanded metal, said skeletal framework comprising a plurality of spaced flexible bands forming a grid-like assembly and including a peripheral margin corresponding generally to the outline of said sheet of flexible expanded metal.

14. An adjustable shaping mold as claimed in claim 13, wherein each said adjustable support means comprises an actuating rod affixed at one end to said skeletal framework.

15. An adjustable shaping mold as claimed in claim 14, wherein said spaced flexible bands are disposed in an overlapping abutting relationship defining a plurality of intersections and each said actuating rod is affixed to said grid-like assembly at one end of said intersections.

16. An adjustable shaping mold as claimed in claim 14, wherein said one end of said actuating rod includes an enlarged portion adapted for attachment to said skeletal framework.

17. An adjustable shaping mold as claimed in claim 12, wherein said fibrous, heat resistant material is treated with a rigidizing material for increasing the stiffness thereof, said fibrous, heat resistant material being adhesively secured over its surface to said resilient body.

* * * * *

UNITED STATES PATENT AND TRADEMARK OFFICE
CERTIFICATE OF CORRECTION

PATENT NO.   :   4,983,204
DATED        :   January 8, 1991
INVENTOR(S)  :   John W. Borer et al.

It is certified that error appears in the above-identified patent and that said Letters Patent is hereby corrected as shown below:

Column 3, line 44, after "11" insert a period --.--.

Column 6, line 41, after "81" insert a period --.--.

Column 8, line 54, change "10$" to --108--.

Column 9, line 33, change "1 1/8 8" to --1/8--.

COLUMN 12:

Claim 15, line 11, after "end" insert --to one--.

Claim 17, line 17, change "12" to --2--.

Signed and Sealed this

Twentieth Day of October, 1992

*Attest:*

DOUGLAS B. COMER

*Attesting Officer*      Acting Commissioner of Patents and Trademarks